April 17, 1934.  C. BORNMANN  1,955,170

PHOTOGRAPHIC COPYING APPARATUS

Filed Jan. 21, 1932  2 Sheets-Sheet 1

INVENTOR.
CARL BORNMANN.
BY Philip S. Hopkins
ATTORNEY.

April 17, 1934.  C. BORNMANN  1,955,170
PHOTOGRAPHIC COPYING APPARATUS
Filed Jan. 21, 1932  2 Sheets-Sheet 2
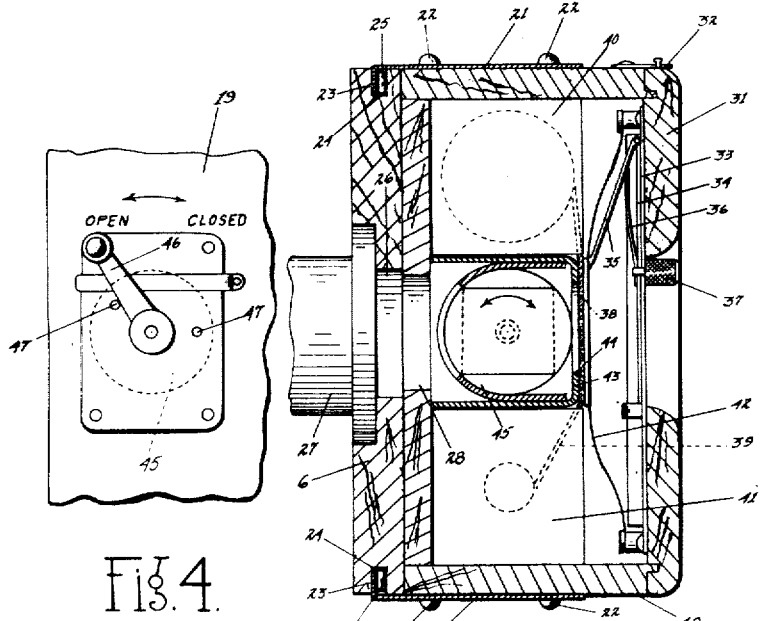
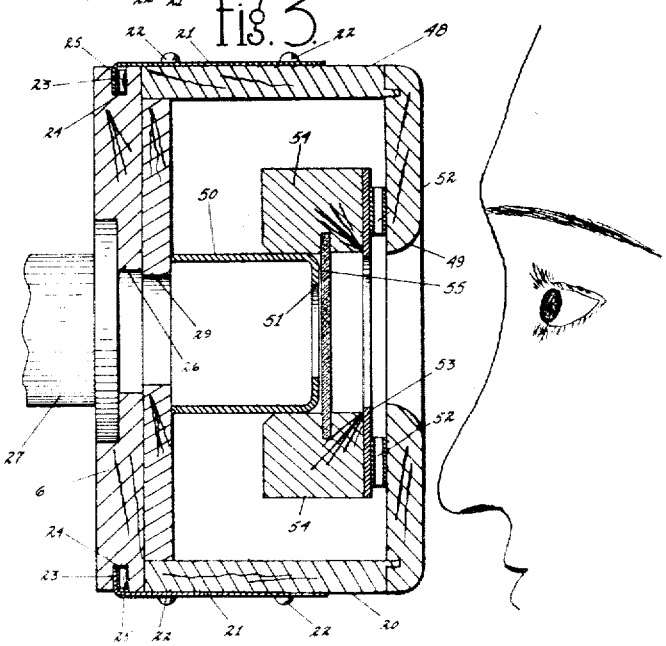
INVENTOR.
CARL BORNMANN
BY Philip S. Hopkins
ATTORNEY.

Patented Apr. 17, 1934

1,955,170

UNITED STATES PATENT OFFICE 1,955,170

PHOTOGRAPHIC COPYING APPARATUS

Carl Bornmann, Binghamton, N. Y., assignor to Agfa Ansco Corporation, Binghamton, N. Y., a corporation of New York Application January 21, 1932, Serial No. 587,895

5 Claims. (Cl. 95—44)

My invention relates to a photographic copying apparatus and has for its principal object the provision of a simple inexpensive mechanism for easily and accurately copying photographs, documents, or other material without the usual expensive and complicated apparatus heretofore necessary for such work.

One important object of my invention lies in the provision of a copying apparatus using roll film whereby a series of photographically copied images may be provided consecutively on a single strip of film and developed in that form for printing, projection, or enlarging as may be desired.

Still another object of my invention lies in the provision of a simple and expedient focusing means for my copying apparatus.

Other objects and advantages in details of construction will be apparent as the description proceeds, reference now being had to the figures of the accompanying drawings forming a part of this application and wherein like reference numerals indicate like parts.

In the drawings:

Figure 3 is a detail sectional view of the copying camera on line 3—3 of Figure 2.

Figure 4 is a detail view illustrating the shutter operating means.

Figure 5 is a sectional view of the focusing portion of the apparatus on line 5—5 of Figure 2.

Figure 1:
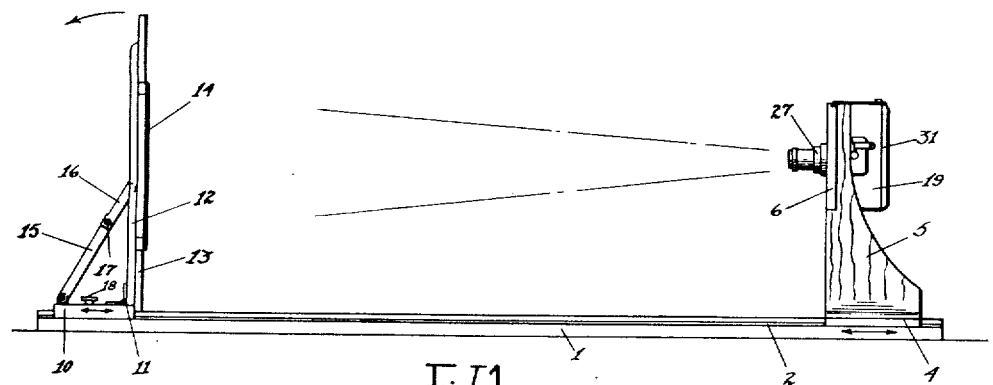
Figure 1 is a side view of my copying apparatus.

The reference character 1 indicates a support provided on each side with grooves 2 forming a slideway for plates 3 secured to the bottom cross piece 4 of a frame member which includes the spaced wide uprights 5, and the top supporting block 6 extending between the sides 5.

This frame by virtue of the plates 3 operating in the grooves 2, is slidable longitudinally of the base 1 and may be locked in any desired position as by means of the set screw 7 carried by the cross piece 4 and cooperating with a binding washer 8 slidable in a shouldered groove or slot 9, centrally of the base 1.

Also slidably mounted on the base 1 is a supporting member 10 hinged adjacent the front end of which as at 11 is an easel 12 provided on its front face with a holder 13 adapted to removably hold the subject 14 to be copied, such as a photograph, document, manuscript or the like.

The easel 12 may be supported in its vertical position by means of pivoted links 15 and 16 connected to the base 10 and to the easel 12 and pivoted together as at 17. A locking screw 18 is also provided on the supporting base 10 whereby the same may be locked in any desired position on the base 1. This locking screw is identical with the screw 7 illustrated in Figure 2.

Obviously therefore, the supporting easel and the supporting frame 4—5—6, may be positioned on the base 1 at any desired distance from each other.

Slidably mounted upon the cross piece 6, is a taking camera 19 and a focusing camera 20. These cameras are secured together by means of strips 21 extending across the tops and bottoms of said cameras and secured thereto as by means of the screws 22. These strips 21 project forwardly beyond the front of the cameras 19 and 20 and these projecting ends are bent at right angles towards each other as at 23, such bent portions extending into slots 24 formed longitudinally in the top and bottom of the cross piece 6. These bent portions 23 are also provided with light leaf springs 25 within the slots 24 whereby to frictionally and resiliently hold the cameras in any adjusted position and prevent their inadvertent or accidental movement on the supporting cross piece 6.

The cross piece 6 is provided centrally with an opening 26 in which is mounted a suitable lens mount 27 which may be of any desired focusing type and carry any desired lens.

The picture camera 19 is provided on its front side with an opening 28 adapted for alignment with the opening 26 in the cross piece 6. Likewise the focusing camera 20 is provided with an opening 29 in its front side adapted for alignment with the opening 26. Obviously therefore, by simply sliding the cameras along the supporting cross piece 6, either camera may be brought into registry with the opening 26 which, of course, is positioned centrally with respect to the easel 12. The limits of such movement of the cameras 19 and 20 are fixed by means of lugs 30 suitably secured upon the back of the supporting cross piece 6. The stop lugs are so positioned that when the focusing camera is against its adjacent lug the picture taking camera will be in proper alignment with the opening 26 and when the picture taking camera 19 is against its adjacent stop lug, as shown in dotted lines in Figure 2, the focusing camera will be in proper alignment with the opening 26.

The picture taking camera is shown in Figure 3 and comprises a casing provided with a removable back 31 adapted to be held in position on the casing by means of the catch 32 on the top thereof. The inside of the back 31 is provided with a plate 33 upon which is slidably mounted a shuttle 34 provided with a pivoted claw 35 normally pressed outwardly into film engaging position by the spring 36. This shuttle is slidable on the plate 33 by means of the finger piece 37 extending outwardly through a suitable slot in the plate 33 and the back 31 for ready manipulation. The free end of the claw 35 is provided with teeth 38 adapted to engage suitable perforations provided along the side edges of the film 39 whereby to pull the film from the upper film chamber 40 and push the film into the lower film chamber 41. Suitable pressure springs 42 are provided on the back 31 for engagement with the film to hold it flat against a supporting plate 43 in the focal plane of the camera. This plate 43 is, of course, provided with a suitable opening 44 to permit the image entering through the lens and the openings 26 and 28 to reach the sensitized film.

The claw 35 is suitably guided in its reciprocal movements by means of the pressure springs 42.

The particular details of this mechanism just described have not been shown in any great degree of exactness as they form no part of this invention. They are intended as an illustrative form only of a film moving means and not limitative.

Rotatably mounted within the central portion of the picture camera 19 between the film chambers 40 and 41, is a shutter member 45 of the barrel or cylindrical type which may be rotated to either admit or close the light passing through the openings in the front of the camera to the film. This shutter is operable from the outside of the camera as by means of the handle 46 movable to opened and closed positions against fixed stops 47.

The focusing camera 20 comprises merely a casing 48 provided with an enlarged opening 49 in its back in alignment with the opening 29. Centrally within the focusing camera is a frame 50, the rear side of which is apertured as at 51 in alignment with the openings 29 and 49. Suitably secured to the back 49 and on the inside thereof, as by the straps 52 is an open frame 53 mounted on the blocks 54 adapted to be centered above and below the frame 50 and carrying a ground glass or focusing screen 55, adapted when the back is in position to lie directly adjacent the focal plane defined by the opening 51 in the frame 50, corresponding exactly to the focal plane defined by the frame 43 in the picture camera. The straps 52 supporting the blocks 54 are preferably resilient so as to permit the centering of such blocks with respect to the frame 50 and to maintain the ground glass 50 in contact with the focal plane frame.

Figure 2:
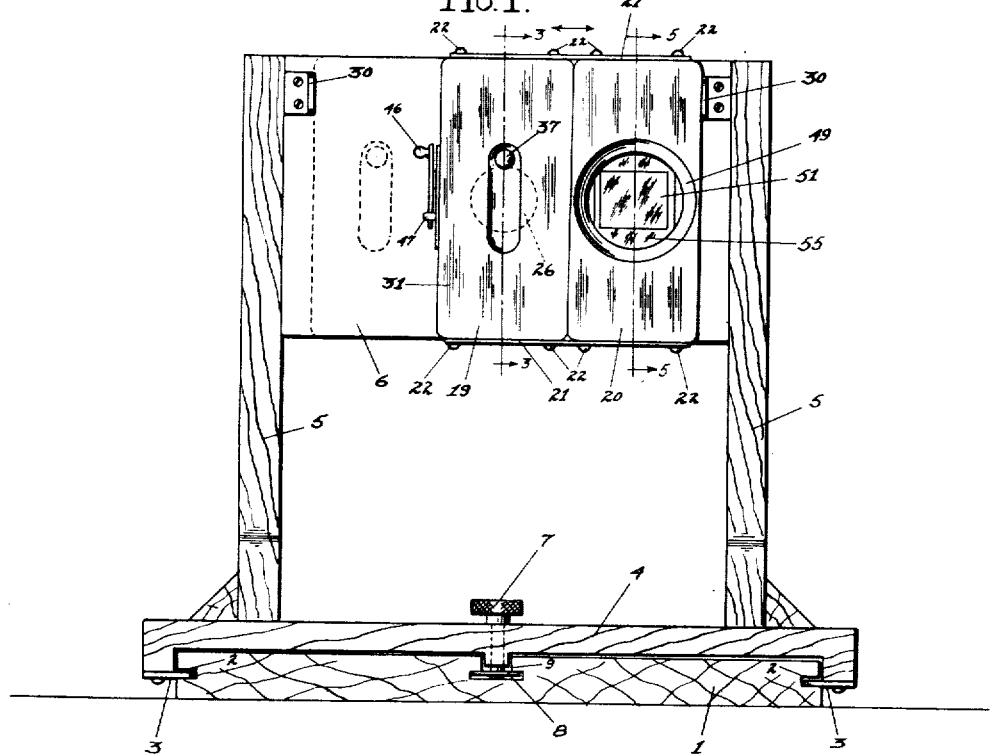
Figure 2 is a rear view thereof.

In operation, the cameras 19 and 20 are first moved to the left in Figure 2 to bring the focusing camera into alignment with the opening 26 and the lens mount 27. In this position the operator makes the necessary adjustments for focus and size and image, sliding the frames 4 and 10 along the base 1 to the proper position and securing them in such position. When the focusing has been accomplished with the desired sharpness in size, the operator merely slides the cameras to the right in Figure 2 bringing the picture taking camera into registry with the opening 26 and the lens mount. He then operates the shutter 45 by means of the handle 46 and makes the desired exposure, closing the shutter after the exposure has been made. He then merely pulls downwardly on the finger piece 37 thus actuating the claws 35 to move the exposed section of the film downwardly into the film chamber 41 and to bring a fresh section of sensitized film into position for the next exposure.

Suitable means are, of course, provided for returning the claw to its original position. This means has not been shown as it forms no part of this invention.

It will be obvious, therefore, that by this copying apparatus I can successively expose images or pictures on a strip of film one after another, keeping such images together until developed and ready for printing, projection, or enlargement as may be desired.

Of course, changes may be made in details of construction and arrangement of parts without departing from the spirit and scope of my invention. I do not limit myself, therefore, to the exact form herein shown and described other than by the appended claims.

I claim:

1. A photographic copying apparatus comprising a frame, a picture taking camera and a focusing camera slidably mounted on said frame, said cameras being secured together for common movement, a lens mount on said frame, said cameras being movable into selective registration with said lens mount, said cameras having focal plane frames in the same plane, and a focus- and dispensing a supply of dentifrice sufficient for but one brushing of the teeth.

2. A photographic copying apparatus comprising an adjustable frame, a picture taking camera and a focusing camera slidably mounted on said frame and secured together for common movement, flanged strips holding said cameras together and cooperating with grooves in said frame for sliding said cameras thereon, and resilient means in said grooves for frictionally holding said cameras in adjusted positions.

3. A photographic copying apparatus comprising an adjustable frame, a picture taking camera and a focusing camera slidably mounted on said frame and secured together for common movement, flanged strips holding said cameras together and cooperating with grooves in said frame for sliding said cameras thereon, resilient means in said grooves for frictionally holding said cameras in adjusted positions, and stop members on said frame for limiting the movement of said cameras.

4. A photographic copying apparatus comprising an adjustable frame, a picture taking camera and a focusing camera slidably mounted on said frame and secured together for common movement, flanged strips holding said cameras together and cooperating with grooves in said frame for sliding said cameras thereon, resilient means in said grooves for frictionally holding said cameras in adjusted positions, stop members on said frame for limiting the movement of said cameras, and a lens mount on said frame adapted to cooperate with said cameras, said stop members also acting to properly register said cameras with said lens mount.

5. A photographic copying apparatus comprising an adjustable frame, a picture taking camera and a focusing camera slidably mounted on said frame and secured together for common movement, flanged strips holding said cameras together and cooperating with grooves in said frame for sliding said cameras thereon, resilient means in said grooves for frictionally holding said cameras in adjusted positions, stop members on said frame for limiting the movement of said cameras, a lens mount on said frame adapted to cooperate with said cameras, said stop members also acting to properly register said cameras with said lens mount, means in said picture taking camera for selectively moving a film strip past said lens mount, and means in said focusing camera for focusing an image in the focal plane of said film, said means including a focusing screen resiliently held in the focal plane of said cameras.

CARL BORNMANN.

CERTIFICATE OF CORRECTION.

Patent No. 1,955,170.      April 17, 1934.

CARL BORNMANN.

It is hereby certified that error appears in the printed specification of the above numbered patent requiring correction as follows: Page 2, lines 106 and 107, claim 1, strike out the words "and dispensing a supply of dentrifice sufficient for but one brushing of the teeth" and insert instead the syllable and words ing screen in said focusing camera normally resiliently held against said frame; and that the said Letters Patent should be read with this correction therein that the same may conform to the record of the case in the Patent Office.

Signed and sealed this 19th day of June, A. D. 1934.

Bryan M. Battey (Seal)      Acting Commissioner of Patents.

cameras in adjusted positions, stop members on said frame for limiting the movement of said cameras, a lens mount on said frame adapted to cooperate with said cameras, said stop members also acting to properly register said cameras with said lens mount, means in said picture taking camera for selectively moving a film strip past said lens mount, and means in said focusing camera for focusing an image in the focal plane of said film, said means including a focusing screen resiliently held in the focal plane of said cameras.

CARL BORNMANN.

CERTIFICATE OF CORRECTION.

Patent No. 1,955,170.                                    April 17, 1934.

CARL BORNMANN.

It is hereby certified that error appears in the printed specification of the above numbered patent requiring correction as follows: Page 2, lines 106 and 107, claim 1, strike out the words "and dispensing a supply of dentrifice sufficient for but one brushing of the teeth" and insert instead the syllable and words ing screen in said focusing camera normally resiliently held against said frame; and that the said Letters Patent should be read with this correction therein that the same may conform to the record of the case in the Patent Office.

Signed and sealed this 19th day of June, A. D. 1934.

Bryan M. Battey (Seal)                                    Acting Commissioner of Patents.